285-31 SR
12/2/86 OR H 000,176

United States Statutory Invention Registration [19]

[11] Reg. Number: H176
[43] Published: Dec. 2, 1986

Johnstone, Jr.

[54] SLIP TEE PIPE FITTING

[75] Inventor: Alexander Johnstone, Jr., Howell Township, Monmouth County, N.J.

[73] Assignee: AT&T Bell Laboratories, Murray Hill, N.J.

[21] Appl. No.: 766,255

[22] Filed: Aug. 16, 1985

[51] Int. Cl.[4] ..... F16L 21/00; F16L 41/00
[52] U.S. Cl. ..... 285/31; 285/156
[58] Field of Search ..... 285/156, 31, 155, 150, 285/151, 152; 403/205, 11

[56] References Cited

U.S. PATENT DOCUMENTS

| | | | |
|---|---|---|---|
| 796,781 | 8/1905 | Welsh | 285/31 |
| 1,823,549 | 9/1931 | Kendall | 285/156 |
| 1,986,010 | 1/1935 | O'Laughlin | 285/156 |
| 2,183,271 | 12/1939 | Wendel | 285/287 |
| 2,480,034 | 8/1949 | Lapp | 285/156 |
| 2,706,134 | 4/1955 | Wilson et al. | 239/204 |
| 2,823,049 | 2/1958 | Hombach | 285/31 |
| 4,070,044 | 1/1978 | Carrow | 285/156 |
| 4,370,790 | 2/1983 | Roadway | 29/157 T |

FOREIGN PATENT DOCUMENTS

| | | | |
|---|---|---|---|
| 1139773 | 1/1969 | United Kingdom | 285/156 |

*Primary Examiner*—Deborah L. Kyle
*Assistant Examiner*—Michael J. Carone
*Attorney, Agent, or Firm*—Patrick E. Roberts

[57] ABSTRACT

A female tee pipe fitting has a stop only in one of its three openings, the other two coaxial openings which are perpendicular to the first opening have smooth inner surfaces and no stops. When two pipes are to be connected, one of the pipes is severed and a section of pipe removed leaving two free ends. A smooth opening of the female tee pipe fitting is slipped over one free end of the severed pipe and then slid out to slide over the other free end of the severed pipe. After the female tee has been centered, the second pipe is inserted within the opening of the female tee pipe fitting with the stop and the joints sealed.

10 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SLIP TEE PIPE FITTING

TECHNICAL FIELD

This invention relates to pipe fittings and, in particular, to female slip tee pipe fittings.

BACKGROUND OF THE INVENTION

Two different pipes at an angle to each other can be connected by a pipe fitting. When the angle is ninety degrees, the pipe fitting is, usually, called a tee. Tee joints may be male, when inserted into a pipe, or female when inserted over a pipe.

Female tee joints usually have two small sections of pipe at ninety degrees to each other, formed integrally, having three ends so that fluid can flow through the three ends. At the intersection of the two pipe sections, near the entry thereto, there are stops built in the inner surface to prevent the female tee from sliding too far over the pipe to be connected and avoiding thereby occlusion of the passage between the pipes.

When two pipes are to be connected by a female tee joint, a section of a first pipe is removed leaving two free ends. A sleeve is slipped over one free end of the first pipe. One end of the female tee is slipped over the other free end of the first pipe. The stop within the female tee prevents the tee from sliding too far over the pipe. A section of pipe which was removed previously is then sized and inserted between the tee joint and the sleeve. The second pipe is then connected to the tee joint. A problem occurs in areas where space is insufficient to effect such a tee joint connection using a sleeve.

SUMMARY OF THE INVENTION

In accordance with the illustrative embodiment of the present invention, there is disclosed a female pipe fitting, or pipe joint, which permits interconnection of three pipes in areas permitting a small working space. The female pipe fitting has two pipe sections formed integrally at an angle and having an interior channel for the passage of fluids therebetween. The pipe fitting has three openings. Two of the openings, on opposite ends of the aforesaid first section, have smooth inner surfaces, unlike the prior art where the inner surfaces have stops which project inwardly. The third opening has a stop which projects inwardly from the inner surface of the fitting.

Three pipes are interconnected by slipping the aforesaid female pipe fitting, using one of the aforesaid smooth surfaced openings, over one end of the first pipe, then sliding the female pipe fitting outwards, axially, and over an end of the second pipe. The female pipe fitting is then rotated so a plumber could look into the third opening of the female pipe fitting, adjust the position of the female pipe fitting to insure that the two pipes do not occlude the passage to the third opening, the two pipes are marked at the two openings of the female tee pipe fitting, and the female tee pipe fitting is rotated to the position of the third pipe. The third pipe is inserted within the third opening but is prevented by the aforesaid stop from penetrating the female pipe fitting so far as to occlude the passage therewithin.

Instead of connecting three different pipes as stated hereinabove, the female pipe fitting may be used to connect two pipes. A section is removed from the first pipe leaving two free ends to which the smooth surfaced openings of the female pipe fitting are connected.

The third opening of the tee receives the second pipe as stated hereinabove.

In the preferred embodiment, the first section of the female fitting makes an angle of ninety degrees with the second section to form a female tee pipe fitting. It is possible also to permit a different angle between the two sections. Furthermore, instead of being on opposite ends of the first section, the two openings could be on different sections. Thus, it is possible to make a pipe fitting with three integrally formed sections, each having a separate opening and the three sections communicating with one another.

The material used for the female pipe fitting in the preferred embodiment is copper. Other material may also be used.

In the preferred embodiment, the first section of the female pipe fitting has a uniform diameter. It is possible to have a female pipe fitting wherein each opening has a separate diameter.

DETAILED DESCRIPTION

Figure 1:
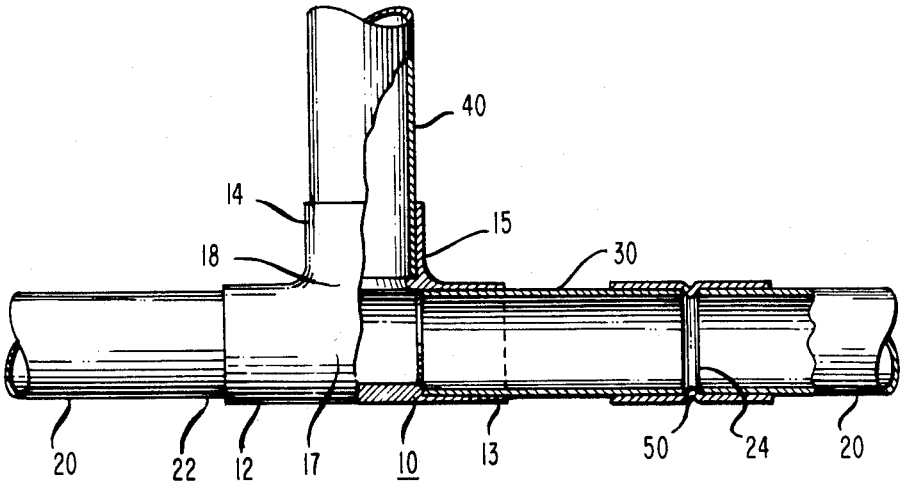
FIG. 1 (PRIOR ART)
FIG. 1 shows a prior art female tee pipe fitting.

Referring to FIG. 1, there is shown a female tee pipe fitting 10 comprising pipe sections 17 and 18, and having openings 12, 13 and 14. Opening 13 fits over an end of pipe 30. Pipe 30 is prevented from entering past stop 15 within female tee pipe fitting 10. Stop 15 is an annular rib on the inner surface of female tee fitting 10, projecting inwards. Likewise, female tee 10 has a stop at end 12, not shown in FIG. 1, to prevent pipe 20 from entering further into tee 10. Pipe 40 is prevented, furthermore, from entering into female tee pipe fitting 10 past stop 15, also an annular rib projecting from the inner surface of tee 10.

In some tees, such as those made from wrought iron, instead of stops, each opening 12, 13 and 14 may be made to be bell mouthed as in U.S. Pat. No. 2,183,271, issued Dec. 12, 1939 to F. B. Wendel. The function of the stop is effected at the junction between the bell mouth and the rest of the tee joint.

When pipe 20 is to be connected to pipe 40, a section of pipe 20 is removed, leaving ends 22 and 24. A sleeve 50 is slipped over end 24 of pipe 20. Then opening 12 of female tee 10 is slipped over end 22 of pipe 20. From the section of pipe which was removed from pipe 20, a portion 30 of pipe is cut and one end inserted within opening 13 of tee joint 10. Thereafter, sleeve 50 is slipped over the other end of pipe section 30 to effect a joint between the two ends 22 and 24 of pipe 20 and provide through opening 14 a branch to pipe 40. Depending upon the material of the pipe, an appropriate seal is effected. For example, if the material is metallic, the joints are welded to effect a good seal impervious to fluids. Thereafter, pipe 40 is inserted into end 14 of tee 10 and the joint sealed.

Figure 2:
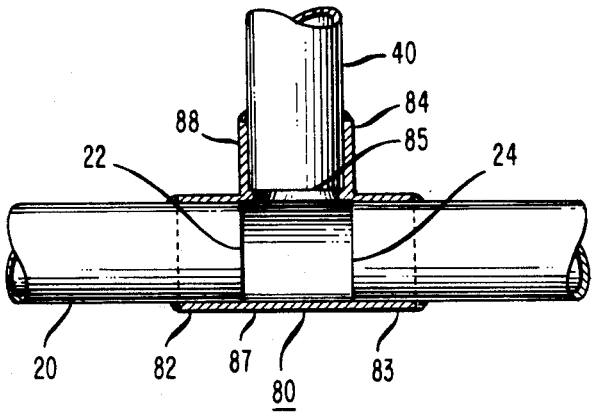
FIG. 2 shows the present invention.

Referring now to FIG. 2, there is shown the improved female pipe tee fitting 80 having pipe sections 87 and 88. Female tee pipe fitting 80 has openings 82, 83 and 84. Opening 82 fits over pipe end 22, opening 83 fits over pipe end 24 and opening 84 fits over an end of pipe 40. Pipe 40 is prevented from traveling further into female tee pipe fitting 80 and from occluding the flow of fluids therethrough by stop 85.

Figure 3:
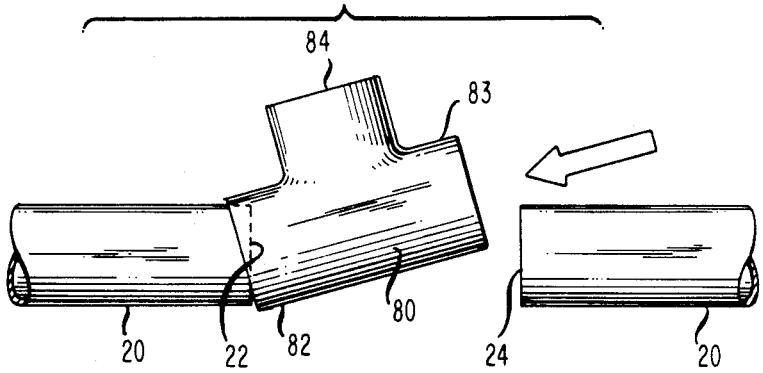
FIGS. 3, 4 and 5 show the method for installing the female tee pipe fitting embodying the present invention.
Figure 4:
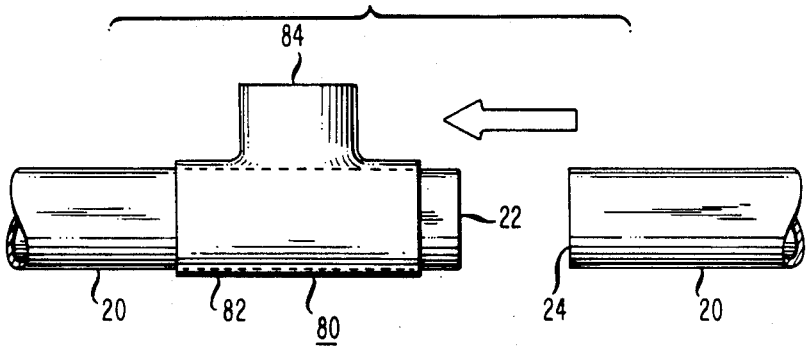
Figure 5:
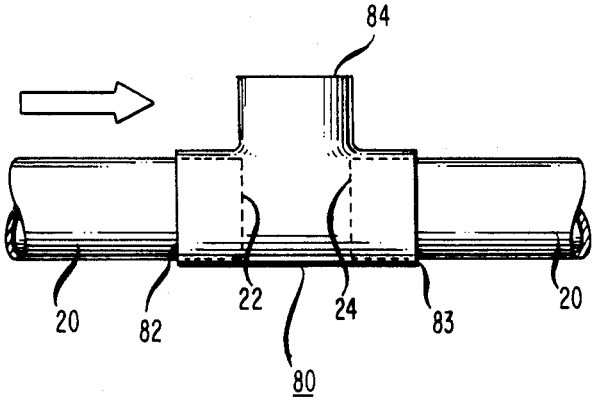

Initially, a section of pipe 20 is removed therefrom leaving free ends 22 and 24. The section removed is substantially smaller in length than in the prior art method. Referring to FIGS. 3, 4 and 5, opening 82 of female tee pipe fitting 80 is slipped over free end 22 of pipe 20 and then slipped back over free end 24.

It is necessary to make sure that neither free end 22 nor free end 24 of pipe 20 occludes the flow of fluids within tee 80. This is done by tilting opening 84 towards the plumber, inspecting the cavity within opening 84, marking pipe 20 adjacent to openings 82 and 83, and then returning end 84 to the position of pipe 40. Pipe 40 is then inserted within opening 84 in accordance with the prior art method. Pipe 40 is prevented from traveling within the cavity of pipe fitting 80 by stop 85, an annular rib projecting inwards from the inner surface of tee 80, as shown in FIG. 2.

The diameter of openings 82 and 83 may be either the same or different. Likewise, opening 84 may have the same diameter as openings 82 and 83 or have a different diameter. Furthermore, the angle between pipe sections 87 and 88 may be other than ninety degrees. In the preferred embodiment the material used is copper. However, other materials may also be used. This novel method of effecting pipe connections is intended for applications where working space is small.

What is claimed is:

1. A female pipe fitting adapted to provide a branch for a pipe from which a section of said pipe has been removed leaving first and second free ends of said pipe, said female pipe fitting comprising first, second and third openings, said first and second openings being opposite each other, smooth surfaced and coaxial, the axis of said third opening being at an angle to the axis of said first and second openings, said first opening adapted to fit over said first free end of said pipe so that said first and second openings of said female pipe fitting slide over said first end of said pipe, said second opening of said female pipe fitting adapted to slide over said second end of said pipe, said female pipe fitting being positioned so that the space through said third opening of said female pipe fitting communicates with said first and second openings of said female pipe fitting and said first and second ends of said pipe, said third opening adapted to receive a second pipe to effect said branch from said pipe, and said section of pipe which has been removed being smaller by a predetermined length than the distance between said first and second openings of said female pipe fitting.

2. The female pipe fitting of claim 1 wherein said angle is ninety degrees.

3. The female pipe fitting of claim 1 wherein the inner surface of said third opening has a stop built therein, said stop preventing a second pipe inserted therein from traveling further so as to permit fluid traveling between said first and second openings to enter said third opening.

4. The female pipe fitting of claim 3 wherein said first and second openings of said female pipe fitting have substantially the same inner diameter.

5. The female pipe fitting of claim 4 wherein said third opening of said female pipe fitting has substantially the same inner diameter as said first and second openings.

6. Apparatus for interconnecting a plurality of pipes, a first one of said pipes having a first end, a second one of said pipes having a second end, and a third one of said pipes having a third end said apparatus comprising, first and second coaxial openings, said first and second openings being opposite to each other, each of said first and second openings being circular in section and having a smooth inner surface, a third opening, said third opening having a circular cross section, said third opening being formed so that fluid can flow between said first, second and third openings, the axis of said third opening being at an angle with the axis of said first and second openings, said first opening of said apparatus adapted to be slipped over said first end of said first pipe, and then said second opening of said apparatus adapted to slip first over said first end of said first pipe and then over said second end of said second pipe, the distance between said first end of said first pipe and said second end of said second pipe being smaller by a predetermined length than the distance between said first and second coaxial openings.

7. The apparatus of claim 6 wherein said third opening has at least one detent on the inner surface thereof to prevent said first end of said second pipe from occluding the passage of fluid between said first and second openings of said apparatus and said third opening of said apparatus.

8. The apparatus of claim 7 wherein said angle is ninety degrees.

9. The apparatus of claim 8 wherein said first and second openings have substantially the same diameters.

10. The apparatus of claim 9 wherein said third opening has substantially the same diameter as said first and second openings.

* * * * *